United States Patent
Santini et al.

(10) Patent No.: US 9,876,412 B2
(45) Date of Patent: Jan. 23, 2018

(54) GAS TURBINES IN MECHANICAL DRIVE APPLICATIONS AND OPERATING METHODS

(71) Applicant: Nuovo Pignone Srl, Florence (IT)

(72) Inventors: Marco Santini, Florence (IT); Marco De Iaco, Florence (IT)

(73) Assignee: Nuovo Pignone Srl, Florence (IT)

( * ) Notice: Subject to any disclaimer, the term of this patent is extended or adjusted under 35 U.S.C. 154(b) by 58 days.

(21) Appl. No.: 14/894,629

(22) PCT Filed: May 29, 2014

(86) PCT No.: PCT/EP2014/061219
§ 371 (c)(1),
(2) Date: Nov. 30, 2015

(87) PCT Pub. No.: WO2014/191543
PCT Pub. Date: Dec. 4, 2014

(65) Prior Publication Data
US 2016/0105078 A1   Apr. 14, 2016

(30) Foreign Application Priority Data
May 31, 2013   (IT) .................. FI2013A0130

(51) Int. Cl.
*F01D 15/10*   (2006.01)
*F02C 6/00*   (2006.01)
(Continued)

(52) U.S. Cl.
CPC ............. *H02K 7/1823* (2013.01); *F02C 3/04* (2013.01); *F02C 7/36* (2013.01); *F16H 47/02* (2013.01);
(Continued)

(58) Field of Classification Search
USPC .......................................... 290/52
See application file for complete search history.

(56) References Cited

U.S. PATENT DOCUMENTS 5,689,141 A    11/1997  Kikkawa et al.
6,787,933 B2 *  9/2004  Claude ................. H02P 9/04
                                             290/52
(Continued)

FOREIGN PATENT DOCUMENTS

WO    2002012692 A1    2/2002
WO    2005047789 A2    5/2005

OTHER PUBLICATIONS

Unofficial English translation of Office Action issued in connection with corresponding CN Application No. 201480031287.2 dated Oct. 8, 2016.
(Continued)

*Primary Examiner* — Pedro J Cuevas
(74) *Attorney, Agent, or Firm* — GE Global Patent Operation (57) ABSTRACT

A drive system for driving a load, comprising a gas turbine configured and arranged for driving the load, an electric motor/generator electrically connected to an electric power grid, a first load coupling connecting the gas turbine to the load, a second load coupling, connecting the load to the electric motor/generator. The electric motor/generator is adapted to function as a generator for converting excess mechanical power from the gas turbine into electrical power and delivering the electrical power to the electric power grid, and as a motor for supplementing driving power to the load. The drive system comprises furthermore a disconnecting device to reversibly disconnect the load from the gas turbine, so that the load can be driven only by the motor.

19 Claims, 2 Drawing Sheets

(51) Int. Cl.
 H02K 7/18   (2006.01)
 H02P 9/04   (2006.01)
 F02C 7/36   (2006.01)
 F02C 3/04   (2006.01)
 F16H 47/02  (2006.01)
 H02K 7/108  (2006.01)
 F02C 3/10   (2006.01)

(52) U.S. Cl.
 CPC ........... *H02K 7/108* (2013.01); *F02C 3/10* (2013.01); *F02C 6/00* (2013.01); *F05D 2220/32* (2013.01); *F05D 2220/764* (2013.01); *F05D 2260/406* (2013.01); *F05D 2260/4023* (2013.01); *F05D 2270/061* (2013.01)

(56) References Cited

U.S. PATENT DOCUMENTS

| | | | | |
|---|---|---|---|---|
| 7,084,524 | B2* | 8/2006 | Lacaze | H02M 5/271 307/3 |
| 7,526,926 | B2* | 5/2009 | Rasmussen | F01D 15/005 290/52 |
| 7,833,125 | B2* | 11/2010 | Carlhammar | B60K 6/48 477/3 |
| 7,944,094 | B2* | 5/2011 | Hoffmann | F02C 9/28 290/52 |
| 8,813,473 | B2* | 8/2014 | Fletcher | F02C 3/30 60/39.55 |
| 8,959,884 | B2* | 2/2015 | Hoffmann | F01K 23/10 290/1 R |
| 9,284,964 | B2* | 3/2016 | Sites | F04D 25/04 |
| 9,488,102 | B2* | 11/2016 | Santini | F01D 15/10 |
| 9,718,343 | B2* | 8/2017 | Atkins | B60K 6/105 |
| 9,759,130 | B2* | 9/2017 | Appukuttan | F02C 7/141 |
| 2002/0163200 | A1 | 11/2002 | Oglesby et al. | |
| 2003/0015873 | A1* | 1/2003 | Khalizadeh | H02P 9/04 290/7 |
| 2003/0060907 | A1 | 3/2003 | Poteet et al. | |
| 2005/0237774 | A1* | 10/2005 | Lacaze | H02M 5/271 363/148 |
| 2006/0017328 | A1* | 1/2006 | Bryde | H02J 9/061 307/64 |
| 2006/0283206 | A1* | 12/2006 | Rasmussen | F01D 15/005 62/619 |
| 2009/0239703 | A1* | 9/2009 | Carlhammar | B60K 6/48 477/3 |
| 2010/0013326 | A1* | 1/2010 | Hoffmann | F02C 9/28 307/151 |
| 2010/0242495 | A1 | 9/2010 | Demoss et al. | |
| 2011/0304155 | A1* | 12/2011 | Hoffmann | F01K 23/10 290/1 R |
| 2013/0055698 | A1* | 3/2013 | Fletcher | F02C 3/30 60/39.55 |
| 2013/0058800 | A1* | 3/2013 | Sites | F04D 25/04 417/53 |
| 2015/0285089 | A1* | 10/2015 | Scarponi | F01D 15/08 60/772 |
| 2015/0345385 | A1* | 12/2015 | Santini | F01D 15/10 290/52 |
| 2017/0259803 | A1* | 9/2017 | Khafagy | B60W 20/13 |

OTHER PUBLICATIONS

International Search Report and Written Opinion issued in connection with corresponding application PCT/EP2014/061219 dated Jun. 25, 2014.

* cited by examiner

GAS TURBINES IN MECHANICAL DRIVE APPLICATIONS AND OPERATING METHODS

BACKGROUND

Field of the Invention

The subject matter disclosed herein concerns improvements to gas turbine systems used in mechanical drive applications. In particular, but not exclusively, the disclosure concerns gas turbine systems for driving compressors, e.g., compressors for refrigerant fluids in liquefied natural gas facilities, compressors for compressing gas in pipeline transportation etc.

The disclosure further concerns improvements in methods for operating a system comprising a gas turbine and a load, e.g., a compressor for LNG, or for oil and gas applications, a pump, or other rotary equipment.

The disclosure further concerns a system for storing pressure energy in a pipeline for gas.

Description of the Related Art

Liquefied Natural Gas (LNG) results from a liquefaction process, in which the natural gas is cooled using one or more refrigeration cycles in a cascade arrangement, until it becomes liquid. Natural gas is often liquefied for storage or transportation purposes, e.g., if pipeline transportation is not possible or economically unfeasible.

Cooling of the natural gas is performed using closed or opened refrigeration cycles. A refrigerant is processed in a compressor or compressors, condensed and expanded. The expanded, chilled refrigerant is used to remove heat from the natural gas flowing in a heat exchanger.

On the contrary, when possible or economically feasible, for transporting gas a pipeline transportation is generally used. To maintain the gas under pressure in the pipeline, one or more compressors are arranged along the pipeline.

Refrigerant compressors in LNG, compressors for pipeline applications or other rotary equipment for applications in the oil and gas industry, are often driven by gas turbines. The gas turbine power availability (i.e., the power available on the turbine power shaft) is dependent upon ambient conditions, e.g., air temperature, and other factors, such as ageing. The turbine power availability increases with decreasing temperatures and, conversely, decreases with increasing temperatures. This causes power availability fluctuations both in the 24 hours as well as during the year, due to daily and seasonal temperature fluctuations.

It has been suggested to provide an electric motor in combination with a gas turbine (e.g., a heavy duty gas turbine or an aero-gas turbine) to drive a load, comprised of, e.g., one or more compressors. The electric motor is operated to supplement mechanical power to the load, to maintain the overall mechanical power on the load shaft constant, when power availability of the turbine decreases and/or to increase the total mechanical power used to drive the load. This function of the electric motor is referred to as helper duty. Another electric motor or, alternatively a pneumatic motor, is usually used also as a starter motor, to accelerate the gas turbine from zero to the rated speed.

When an excess mechanical power is generated by the turbine, e.g., if the ambient temperature drops below the design temperature and consequent increase in power availability of the turbine, or mechanical load required by the compressor drops, the excessive mechanical power generated by the gas turbine is converted into electric power, using the electric helper motor as a generator.

Figure 1:
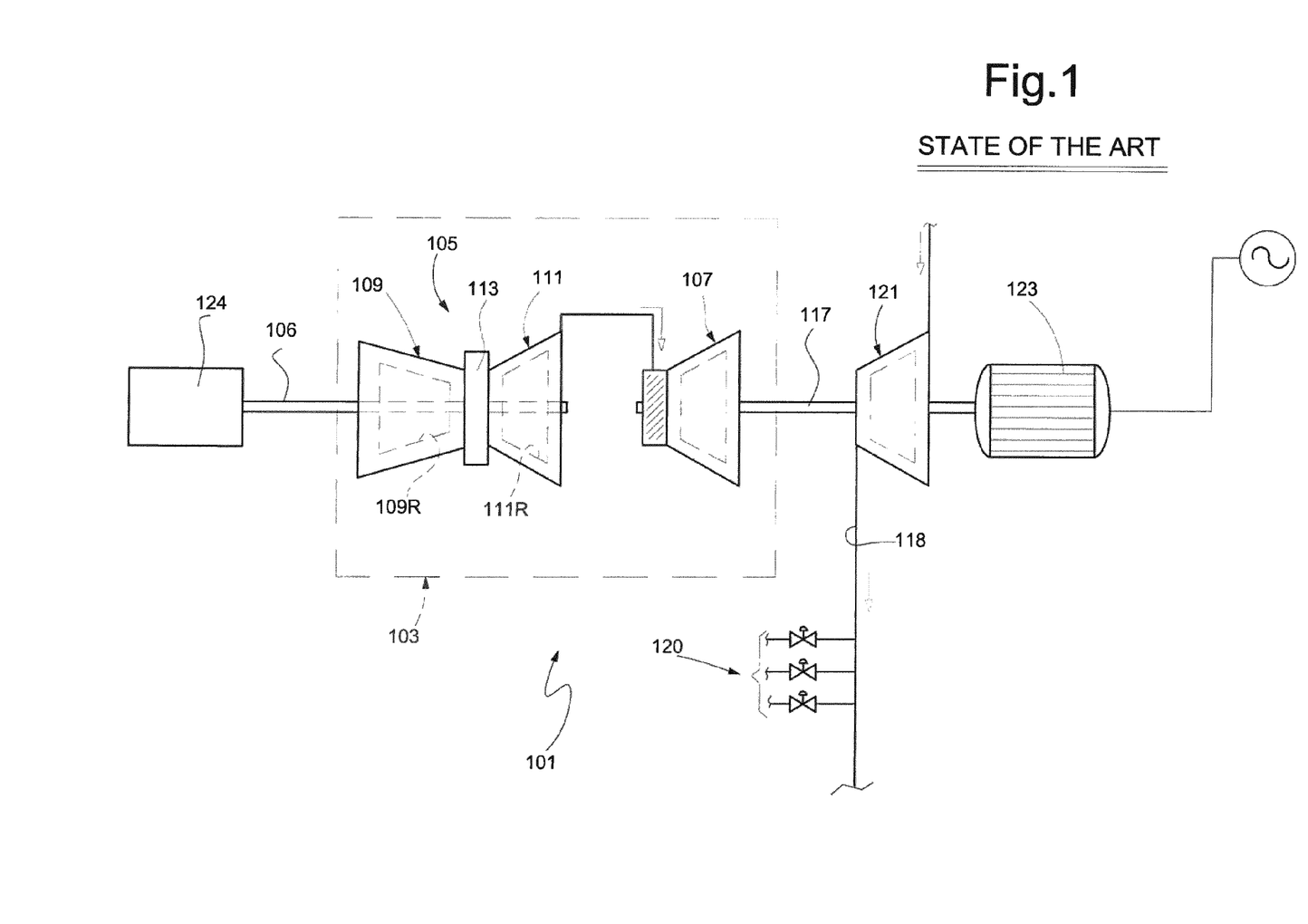
FIG. 1 illustrates a scheme of a gas turbine arrangement according to the background art.

FIG. 1 schematically illustrates a system comprising a gas turbine arranged for mechanical drive applications, e.g., for driving a compressor or compressor train. The system 101 comprises a heavy duty gas turbine 103. The gas turbine is in turn comprised of a gas generator 105 and a power turbine 107. The gas generator 105 is comprised of a compressor 109 and a high-pressure turbine 111. The gas generator 105 comprises a gas generator rotor including the rotor 109R of the compressor 109 and the rotor 111R of the high-pressure turbine 111. The rotor 109R of the compressor 109 and the rotor 111R of the high-pressure turbine 111 are mounted on a common shaft and together form a gas generator rotor.

The compressor 109 compresses ambient air, which is delivered to a combustion chamber or combustor 113, where the compressed air is mixed with a liquid or gaseous fuel and the fuel/air mixture is ignited to generate combustion gas. The high-temperature and high-pressure pressure combustion gas is partly expanded in the high-pressure turbine 111. Mechanical power generated by the gas expansion in the high-pressure turbine 111 is used to drive the compressor 109.

Hot and partly expanded gas exiting the high-pressure turbine 111 flows through the power turbine or low-pressure turbine 107. The combustion gas expands in the power turbine 107 to generate mechanical power made available on a load coupling shaft 117. The power available on the load coupling shaft 117 is used to drive into rotation a load globally labeled 121. The load 121 can comprise a compressor or a compressor train, as an example, arranged in a pipeline 118 for transporting gas to users 120.

The rotor of the power turbine 107 is mechanically separated from, i.e. not torsionally coupled to, the gas generator rotor formed by the compressor rotor 109R and the high-pressure turbine rotor 111R.

The gas generator rotor is connected to a starter motor 124. As an example, this starter motor can be an electric motor connected, through a shaft 106, to the gas generator rotor.

Reference number 123 indicates a reversible electric machine, operating as a helper/generator and arranged at the end of the string comprising the gas turbine 103 and the compressor 121, opposite the starter motor 124. The electric machine 123, when operating as helper, converts electric power into mechanical power to drive the load 117 in combination with the gas turbine 103, for example when the power available from the gas turbine 103 drops, for instance due to increasing environment temperature. When the electric machine 123 is acting as generator, the reversible electric machine can convert available mechanical power, produced by the turbine, into electric power. The electric power can be delivered to an electric power distribution grid.

The system 101 is complex, has a modest operating flexibility, and incurs in some disadvantages. As an example, in a pipeline transportation system, when the gas turbine goes under maintenance or fails, the users 120 cannot extract gas without incurring in a significant pressure drop in the pipeline 118.

SUMMARY OF THE INVENTION

Embodiments of the subject matter disclosed herein provide for a hybrid system, wherein a gas turbine is combined with a reversible electric machine that can be switched in a motor-mode or in a generator mode. According to embodiments of the invention, the system provides for reversible means to disconnect the power transmission from the load to the gas turbine and vice-versa. When switched in the motor mode, the reversible electric machine can provide for a helper duty or for a fully electric powering of the load, also allowing an energy storage duty, as better detailed below, and depending upon the operative conditions of the gas turbine system and needs. When switched in the generator mode, the reversible electric machine can convert available mechanical power, produced by burning a fuel mixed into a flow of compressed air, into electric power. The electric power can be delivered to an electric power distribution grid. In some embodiments or under some conditions, e.g., in case of loss or lack of an electric power distribution grid, the generator can supply electric power for the facilities and ancillary devices of the system comprising the gas turbine and the load driven thereby.

More specifically, the drive system for driving a load, according to a first aspect of the invention, comprises a gas turbine configured and arranged for driving the load, a first load coupling connecting the gas turbine to the load, an electric motor/generator electrically connected to an electric power grid capable to receive and/or to furnish electric power, a second load coupling, connecting the load to the electric motor/generator, wherein the electric motor/generator is adapted to function as a generator for converting excess mechanical power from the gas turbine into electrical power and delivering the electrical power to the electric power grid, and as a motor for supplementing driving power to the load. The drive system comprises also a disconnecting device to reversibly disconnect the load from the gas turbine, so that the load can be driven only by the motor, allowing a fully electric operation of the load.

In an embodiment, a load coupling is a mechanical coupling capable to transmit mechanical power (more particularly by torque) from a member to the load and vice-versa. A mechanical coupling can be provided by a shaft. According to the disclosure, a shaft can be made of a single piece, or two or more pieces axially fixed together and torsionally dependent one to the other.

Torsionally dependent means that the parts fixed together cannot rotate at different rotary speeds and are constructed and arranged as mechanically joined members.

Torsionally independent means that the parts can rotate at different rotary speeds and are constructed and arranged as mechanically separate members.

In an embodiment, the disconnection or connection made by the disconnecting device is operated manually by an operator or automatically by a motorization or without motorization. More particularly, the disconnecting device can be or comprise a clutch (e.g., a self-synchronizing clutch) between the load and the gas turbine, as an example, associate respectively to the end of an axis torsionally coupled to the load and to the end of an opposite axis torsionally coupled to the gas turbine. Alternatively, the disconnecting device can be or can comprise a removable coupling or a hydraulic torque converter.

According to some embodiments, the second coupling can be arranged opposite to the first coupling with respect to the load, such that the load is arranged between the gas turbine and the electric motor/generator.

In an embodiment, a direct coupling is provided between the at least one compressor and the electric motor/generator; more particularly the at least one compressor and the electric motor/generator may have a common shaft.

In other embodiments, between the at least one compressor and the electric motor/generator a coupling comprising a further clutch is provided.

In some embodiments, the load comprises at least one compressor. More particularly, the compressor is arranged in a pipeline for transportation of gas, for compressing the gas in the pipeline.

In many embodiments, the gas turbine comprises a gas generator including a gas generator rotor and a power turbine including a power turbine rotor, wherein the rotor of the power turbine is mechanically separated from, or not torsionally coupled to, the gas generator rotor. Torsionally independent means that the power-turbine rotor and the gas-generator rotor can rotate at different rotary speeds and are constructed and arranged as mechanically separate members, power from the gas generator to the power turbine being transferred thermodynamically, through the combustion gas flow.

In some embodiments, the gas generator is comprised of a compressor, a combustion chamber, and a high-pressure turbine; the gas generator rotor including a first rotor of the compressor and a second rotor of the high-pressure turbine, the first rotor of the compressor and the second rotor of the high-pressure turbine are mounted on a common shaft.

In some embodiments, the power turbine can be comprised of movable nozzle guide vanes that can be used to modify the flow conditions of the combustion gas entering the power turbine from the gas generator. The gas turbine can be a heavy duty gas turbine.

In other embodiments, the gas generator compressor is provided with movable inlet guide vanes controlled to modify the air inlet flow rate depending upon the operating conditions of the gas turbine and of the load driven. The gas turbine can be of the aero-derivative type.

Some embodiments can comprise a frequency converter connected between the electric motor/generator and the electric power grid, the frequency converter being configured and controlled for conditioning the electric frequency from the electric power grid to the electric motor/generator and from the electric motor/generator to the electric power grid. More particularly, the electric motor/generator is of the variable-frequency drive (VFD) type.

In an embodiment, the electric power grid can comprise units for generating renewable electric power, as wind turbines, solar panel, etc.

According to a second aspect, the subject-matter of the disclosure concerns a method of operating a gas turbine system comprised of a gas turbine and a load driven by the gas turbine, the method comprising providing a gas turbine, mechanically coupling a load to the gas turbine, mechanically coupling an electric motor/generator to the load, with the electric motor/generator arranged opposite to the gas turbine with respect to the load, generating mechanical power by means of the gas turbine, powering the load with the mechanical power generated by the gas turbine; when the mechanical power generated by the gas turbine exceeds the mechanical power required to drive the load: operating the electric motor/generator in a generator mode; transferring excess mechanical power from the gas turbine to the electric motor/generator; and converting the excess mechanical power into electric power in the electric motor/generator; when the mechanical power generated by the gas turbine is not null and less than the power required to drive the load: operating the electric motor/generator in a motor mode; electrically powering the electric motor/generator; converting electric power into supplemental mechanical power in the electric motor/generator; transferring the supplemental mechanical power from the electric motor/generator to the load; driving the load with combined power generated by the gas turbine and supplemental mechanical power generated by the electric motor/generator; when the mechanical power generated by the gas turbine is null or the gas turbine is turning off: disconnecting the gas turbine from the load, operating the electric motor/generator in a motor mode, converting electric power into mechanical power in the electric motor/generator, transferring the mechanical power from the electric motor/generator to the load, driving the load with the mechanical power generated by the electric motor/generator.

In many embodiments of the method, the load comprises at least one compressor. More particularly, the at least one compressor compresses gas in a pipeline for gas transportation or the like.

According to a third aspect, the subject-matter of the disclosure concerns a system for storing pressure energy in a pipeline for gas, comprising: at least one compressor arranged in the pipeline and design to compress the gas in the pipeline, a gas turbine configured and arranged for driving the at least one compressor, an electric motor/generator electrically connected to an electric power grid, a first load coupling connecting the gas turbine to the at least one compressor, a second load coupling, connecting the at least one compressor to the electric motor/generator, the electric motor/generator being adapted to function as a generator for converting excess mechanical power from the gas turbine into electrical power and delivering the electrical power to the electric power grid, and as a motor for supplementing driving power to the at least one compressor, a disconnecting device to reversibly disconnect the at least one compressor from the gas turbine, so that the at least one compressor can be driven only by the motor; wherein the system provide a phase of disconnection of the at least one compressor from the gas turbine, and a subsequent phase of compression of gas in the pipeline by operating the at least one compressor only by means of the electric motor. The gas is opportunely compressed to a pressure value in the pipeline above the service value of the gas in the pipeline.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

Figure 2:
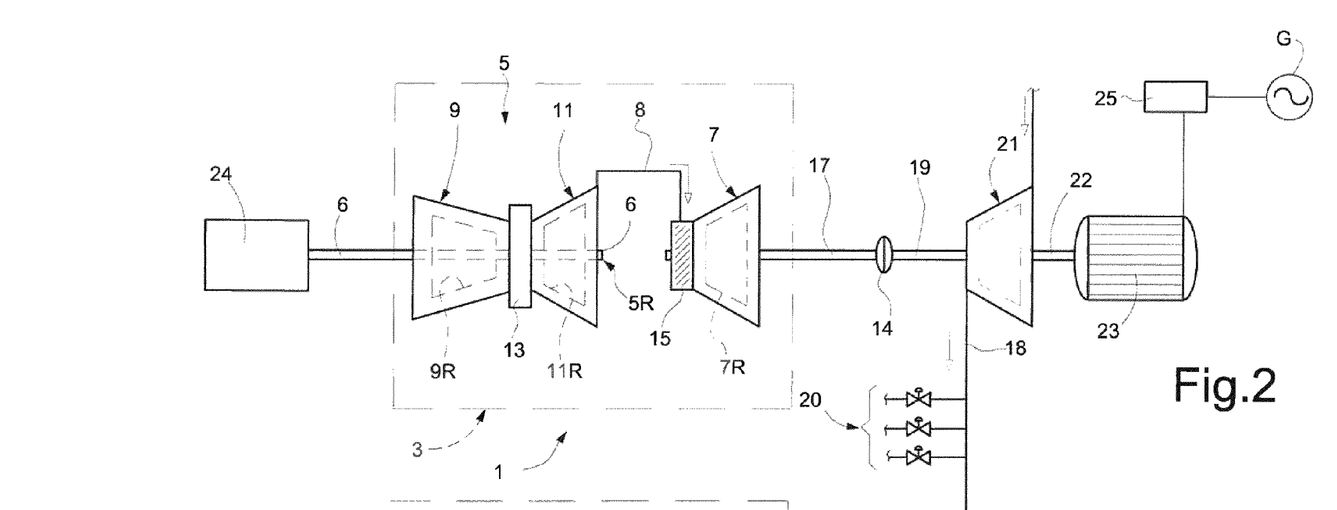
FIG. 2 illustrates a scheme of a gas turbine arrangement according to the present disclosure.

FIG. 2 illustrates a first embodiment of the subject matter disclosed herein. A mechanical drive system 1 comprises a gas turbine 3. The gas turbine 3 comprises a gas generator 5 and a power turbine or low-pressure turbine 7. The gas generator 5 can be comprised of a gas-generator compressor 9 and a high-pressure turbine 11. The compressor rotor is schematically shown at 9R and the high-pressure turbine rotor is shown at 11R. The rotors 9R and 11R are mounted on a common shaft 6 and together form a gas generator rotor 5R.

The gas-generator compressor 9 compresses air from the environment, which is delivered to a combustor 13. In the combustor 13 fuel is added to the air flow and a fuel/air mixture is formed and ignited. The combustion gas generated in the combustor is delivered to the high-pressure turbine 11 and partly expands therein, generating mechanical power. The mechanical power generated by the high-pressure turbine 11 is used to drive the gas-generator compressor 9.

The partly expanded combustion gas flows, passing the line 8, through the power turbine 7, where it further expands to generate additional mechanical power. In the embodiment illustrated in FIG. 2 the power turbine 7 is comprised of movable nozzle guide vanes schematically shown at 15. The movable nozzle guide vanes 15 can be used to modify the flow conditions of the combustion gas entering the power turbine 7. In some embodiments the movable nozzle guide vanes 15 can be used to modify the combustion gas flow section, thus increasing or decreasing the pressure at the outlet of the high-pressure turbine 11. Increasing the gas pressure at the outlet of the high-pressure turbine 11 reduces the enthalpy drop across the high-pressure turbine 11. A higher enthalpy drop is thus available across the power turbine 7, which can produce more mechanical power, which will be available on the turbine output shaft. By regulating the movable nozzle guide vanes 15 the rotary speed of the gas generator rotor 5R can be adjusted and the amount of power available on the output shaft of the power turbine 7 can be modulated.

The power turbine 7 is comprised of a power turbine rotor 7R mounted on a power turbine shaft 17, which is torsionally independent of the shaft 6 of the gas generator 5, i.e., the power turbine shaft 17 rotates independently of shaft 6 of the gas generator shaft 5R. The gas generator shaft 6 is connected with a starter 24, e.g., an electric motor or a hydraulic motor.

The gas turbine 3 is, as an example, a heavy duty gas turbine.

The power turbine shaft 17 is connected, through a first load coupling shaft 19 (that is a mechanical coupling), to a load generally shown at 21, which is driven in rotation by the power available on the power turbine shaft 17 and generated by gas expansion in the power turbine 7. In some embodiments the load 21 can include one or more compressors, for example one compressor 21 as shown by way of example in the embodiment of FIG. 2.

As an example, the compressor 21 is arranged in a pipeline 18 for transporting gas to users 20.

The system 1 comprises a disconnecting device 14 to reversibly disconnect the load 21 from the gas turbine 3. As an example, the disconnecting device 14 is arranged between the power turbine shaft 17 and the first load coupling shaft 19. The disconnecting device 14 has, in practice, at least two operation modes, a connecting operation mode, wherein the power (torque) from the gas turbine 3 is transmitted to the load, and a disconnecting operation mode, wherein the power (torque) from the gas turbine to the load cannot be transmitted (as an example, the lack of transmission can be due to a physical separation between a part connected to the gas turbine and a part connected to the load).

The disconnecting device can be operated manually by an operator or automatically by a motorization or actuator or with a self-synchronizing clutch.

In this embodiment, the disconnecting device 14 is a clutch mechanically connecting the power turbine shaft 17 and the first load coupling shaft 19.

As an example, the coupling parts of the clutch can be connected or disconnected by means of an actuator automatically operated by an operator or by an electronic controller programmed to disconnect/connect the turbine from/to the load under certain conditions, as better explain below. In other embodiments, the actuator can be manually operated by the operator.

In other embodiments, the disconnecting device 14 can comprise a hydraulic torque converter.

In other embodiments, the clutch can be of the magnetic type.

In other further embodiments, the disconnecting device 14 can comprise a removable coupling, as an example a removable coupling with bolts fixing the opposite coupling parts connected with the load and with the gas turbine.

One or more joints can be arranged between the power turbine 7 and the load 21, for example one or more flexible joints, to adjust for angular mismatches and/or to compensate for thermal expansion of the coupling. In other embodiments, not shown, a speed manipulation system, such as a gearbox, can be arranged between the power turbine 7 and the load 21, e.g., when the power turbine 7 and the load 21 rotate at different rotary speeds. It is clear that those one or more joints and speed manipulation system are associated to the power turbine shaft 17 or the first load coupling shaft 19 and are in addition to and different from, the disconnecting device 14.

An electric machine 23, i.e., an electric machine that can operate selectively as an electric generator or an electric motor, is connected to the load 17 (in this embodiment, a compressor) by a second load coupling shaft 22. The reversible electric machine will be referred to here below as an electric motor/generator 23.

In an embodiment, a direct coupling shaft 22 is provided between the load 21 and the electric motor/generator 23. In other embodiments, to the coupling shaft 22, one or more flexible joints, to adjust for angular mismatches and/or to compensate for thermal expansion of the coupling, can be associated. In other embodiments, a further clutch can be provided in the coupling shaft 22, such that the load can be separated from the electric motor/generator 23.

The electric motor/generator 23 is adapted to function as a generator for converting excess mechanical power from the gas turbine 3 into electrical power and delivering the electrical power to an electric power grid G, and as a motor for driving power to the load 21.

In an embodiment, the electric motor/generator 23 is combined with an electric power conditioning unit, e.g., a variable frequency driver 25. For the purposes which will become clearer later on, the variable frequency driver 25 allows the electric motor/generator 23 to rotate at a speed which is independent of the electric frequency on the grid G, so that the electric motor/generator 23 can be used to provide supplemental mechanical power to the system 1, e.g., when the power available from the gas turbine 3 drops, allowing the gas turbine to rotate at a speed which is independent of the grid frequency. The same variable frequency driver also allows the electric motor/generator to operate in the generator mode and supply electric power to the grid, rotating the electric motor/generator 23 at a speed different from the grid frequency and independent therefrom.

The operation of the system described so far is as follows.

To start the system the starter 24 is powered, such that the gas generator rotor 5R rotates.

When a sufficient air flow rate at the outlet of the gas-generator compressor 9 has been achieved, the combustor 13 can be ignited and the gas generator 5 starts operating. A flow of hot pressurized combustion gas is formed in the combustor 13 and delivered through the high-pressure turbine 11, which gradually takes over the task of rotating the gas-generator compressor 9, and through the power turbine 7.

The driving of the gas generator 5 is finally entirely taken over by the high-pressure turbine 11 and the power turbine 7 gradually accelerates, driving the load 21 into rotation.

When the gas turbine 1 has reached a steady-state condition, the starter 24 can be set in a non-operative condition. Concerning the operation of the electric motor/generator 23, the operation mode as a helper (motor mode) can be required, e.g., when the power generated by the power turbine 3 and made available on the power turbine shaft 17 is insufficient to drive the load 21 at the required speed. The electric motor/generator 23 can be operated in the motor mode also in other situations, e.g., in order to save fuel and use electric energy instead. This can be useful for instance at night time, when the cost of the electric energy available from the electric distribution grid G is less than the cost of the fuel.

Vice-versa, the electric motor/generator 23 can be switched to the generator mode e.g., in case of grid loss, i.e., when electric power from the electric power distribution grid G is not available. In this case the electric motor/generator 23 will provide electric energy to power the system and any other facility or auxiliary unit associated therewith.

In some embodiments, the electric motor/generator 23 can be set to operate in the generator mode also if the power available from the gas turbine exceeds the power required to drive the load and, e.g., the cost of the electric energy is higher than the cost of the fuel, e.g., during peak hours, so that producing electric energy by means of fossil fuel (liquid or gaseous) and selling the electric energy produced becomes economically advantageous. Under some circumstances the electric motor/generator 23 can be switched to the generator mode also for correcting the power factor.

An electronic gas turbine controller (not shown) can be provided for controlling the system 1 in the various different modes of operation.

Several factors can modify the operating conditions of the system 1, making surplus power from the gas turbine 3 available or requiring supplemental power for driving the load 21. For example, if the load 21 comprises one or more compressors, the gas flow through the compressors can fluctuate, thus provoking a fluctuation in the power required for driving the load.

Environment conditions, in particular environment temperature can modify the operating conditions of the gas turbine 3. Increasing environment temperature reduces the power available on the power turbine shaft 17 of the power turbine 7. A drop in the ambient temperature, vice versa, causes an increase in the available of the output of the gas turbine 3.

When the electric motor/generator operates in the generator mode, the variable frequency driver 25 allows the electric motor/generator 23 to rotate at a frequency which is non-synchronous with the frequency of the electric power distribution grid G. The electric power generated by the generator 23 will then be conditioned by the variable frequency driver 25 so that the electric power delivered to the electric power distribution grid G will be identical with the grid frequency. When the electric motor/generator 23 operates in the motor mode, the variable frequency driver 25 allows the motor to rotate at the required speed, corresponding to the rotation speed of the gas generator rotor R, the speed being independent of the electric frequency of the electric power distribution grid G. The rotary speed of the gas generator thus becomes independent of the grid frequency.

As described above, in some conditions the helper mode can be triggered when the requested rotary speed cannot be achieved using only the power available from the gas turbine, i.e., when the fuel delivery reached the maximum value without achieving the requested rotary speed of the power turbine. However, in some circumstances the system 1 can be controlled so that part of the power required to drive the load 21 is delivered by the electric motor/generator operating in the helper mode, limiting the fuel flow rate, in order to save fuel even if the gas turbine would be capable of providing sufficient power to drive the load by itself. This can be done, e.g., when the cost per electric energy unit is lower than the cost of the equivalent amount of fuel, e.g., at night time. It can be economically advantageous to drive the load 21 in a hybrid mode, combining electric power from the electric motor/generator 23 running in the helper mode, with mechanical power generated by the gas turbine, the turbine being operated at less than its maximum power rate, with a reduced amount of fuel delivered thereto. The mode of operating the system would be the same as described above, but the electric motor/generator would be put into operation in the helper mode (motor mode) before the combustion gas temperature at the stack achieves the maximum set point value.

When the electric motor/generator 23 is in the generator mode, the disconnecting device 14 should be in connecting operation mode, since it needs mechanical power from the gas turbine 3 through the first mechanical load coupling (shafts 17-19) connecting the gas turbine 3 to the load 21 and through the second mechanical load coupling (shaft 22), connecting the load to the electric motor/generator 23. The disconnecting device 14, in connecting operation mode, transmits the torque from the shaft 17 to the shaft 18 of the load 21.

When the electric motor/generator 23 is in the motor mode, the disconnecting device 14 can be in the connecting operation mode or in the disconnecting operation mode.

The electric motor/generator 23 is operated as helper for the gas turbine 3 when it is in the motor operation mode. In some conditions, the helper mode can be triggered when the requested rotary speed of the load cannot be achieved using only the power available from the gas turbine, i.e. when the fuel delivery reached the maximum value without achieving the requested rotary speed of the power turbine. However, in some circumstances the system 1 can be controlled so that part of the power required to drive the load 21 is delivered by the electric motor/generator operating in the helper mode, limiting the fuel flow rate, in order to save fuel even if the gas turbine would be capable of providing sufficient power to drive the load by itself. This can be done, e.g., when the cost per electric energy unit is lower than the cost of the equivalent amount of fuel, e.g., at night time. It can be economically advantageous to drive the load 21 in a hybrid mode, combining electric power from the electric motor/generator 23 running in the helper mode, with mechanical power generated by the gas turbine, the turbine being operated at less than its maximum power rate, with a reduced amount of fuel delivered thereto.

The helper mode is substantially a hybrid mode for operating the load (power in part from the gas turbine 3, in part from the electric motor 23). It is clear that, according to this kind of operating of the load, the disconnecting device 14 has to be in connecting operation mode, since, as state above, there is need of mechanical power from the gas turbine 3 through the first mechanical load coupling (shafts 17-19) connecting the gas turbine 3 to the load 21 and through the second mechanical load coupling (shaft 22), connecting the load to the electric motor/generator 23. The disconnecting device 14 in connecting operation mode, transmits the torque from the shaft 17 to the shaft 18 of the load 21.

In some conditions, the disconnecting device 14 is in the disconnecting operation mode. Therefore, no power transmission (torque transmission) from the gas turbine 3 to the load 21 (as an example, in the case of a disconnection device in form of a clutch, the two opposite parts of the clutch 21 are separated) is given. In such a case, when the electric motor/generator 23 is operated as motor, the load 21 is driven only by the motor 21, powered by electric power distribution grid G.

This configuration is particularly useful for several reasons.

First of all, when the gas turbine fails or is shutdown, or is under maintenance, after disconnecting the load from the gas turbine by means of the disconnecting device 14, the load can be driven by the electric motor 23, providing power and operability to the system.

The disconnection of the load from the gas turbine, allows the load to be operated in fully electric mode during specific periods of the day or the week when the electricity cost is low (as an example, during night or week end).

The fully electric operation mode is useful also in periods when there is an overproduction of electricity mainly due to renewable sources, e.g., solar or wind sources, if the electric motor/generator is connected to a renewable electric power system (solar panels, wind turbines, etc.)

Other benefits linked to the presence of the disconnecting device are related to the possibility of storage energy (in form of pressure energy) in pipeline for gas transportation. With reference to FIG. 2, considering the pipeline 18 for transportation of gas to users 20, the load 21 is a compressor (or a compressor train) for compressing the gas in the pipeline. During normal use, the gas turbine 3 (eventually with the cooperation of the motor/generator 23 as helper) drives the compressor 21 until a certain pressure value (service value) is reached in the pipeline. When a certain amount of gas is requested by a user 20, pressure in the pipeline decreases. When the pressure value goes under a preset pressure value, the gas turbine is turned on driving the compressor.

In this situation, when the pressure value is at the service value, the gas turbine is turned off. If the disconnecting device 14 is in the disconnecting operation mode, operating the compressor 21 by the electric motor 23 causes increasing of the pressure level in the pipeline above the service value. Therefore, when a certain amount of gas is requested by a user 20, the moment for the gas turbine to be operated is driven forward, with fuel savings.

The increasing of pressure in the pipeline can be considered a pressure energy storage. This energy storage is particularly convenient when the cost of the electric power is low, as such during night, week end or if the electric power come from a renewable electric source.

Figure 3:
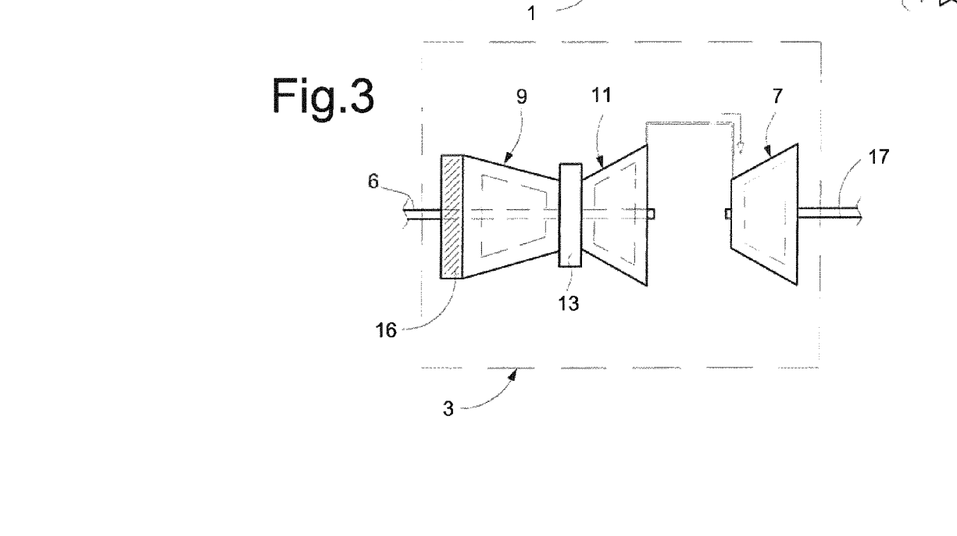
FIG. 3 illustrates a variant of a gas turbine of FIG. 2, according to the present disclosure.

FIG. 3 illustrates a variant of the gas turbine 3 disclosed in FIG. 2. The same or equivalent components, parts or elements as in FIG. 2 are indicated with the same reference numbers.

In this case, the gas-generator compressor 9 is provided with movable inlet guide vanes schematically shown at 16. The movable inlet guide vanes 16 can be controlled to modify the air inlet flow rate depending upon the operating conditions of the gas turbine and of the load driven thereby. Contrary to the previously described embodiment of FIG. 2, the power turbine 7 is not provided with movable nozzle guide vanes.

The gas turbine 3 of FIG. 3 can, e.g., be an aero-derivative gas turbine, such as a PGT25 or a PGT25+, available from GE Oil & Gas, Florence, Italy. According to the subject matter of the invention, the functioning of the system 1 is substantially the same both in the case of gas turbine of FIG. 2, and in the case of gas turbine of FIG. 3.

Therefore, the invention provides also a method of operating a gas turbine system comprised of a gas turbine 3 and a load, more particularly at least a compressor 21 arranged in a pipeline 18 for transportation of gas to users 20, wherein the compressor is driven by the gas turbine 3. The method provides for a step of providing a gas turbine 3, a step of mechanically coupling at least compressor 21 to the gas turbine 3, a step of mechanically coupling an electric motor/generator 23 to the compressor 21, with the electric motor/generator 23 arranged opposite to the gas turbine 3 with respect to the compressor, a step of generating mechanical power by means of the gas turbine 3, and a step of powering the compressor with the mechanical power generated by the gas turbine 3. When the mechanical power generated by the gas turbine 3 exceeds the mechanical power required to drive the compressor 21, the method provides the step of operating the electric motor/generator 23 in a generator mode, the step of transferring excess mechanical power from the gas turbine 3 to the electric motor/generator 23 and the step of converting the excess mechanical power into electric power in the electric motor/generator 23. When the mechanical power generated by the gas turbine 3 is not null and less than the power required to drive the load (that means that the turbine is not shutdown), the method provides the step of: operating the electric motor/generator 23 in a motor mode, the step of electrically powering the electric motor/generator 23, the step of converting electric power into supplemental mechanical power in the electric motor/generator 23, the step of transferring the supplemental mechanical power from the electric motor/generator 23 to the compressor and the step of driving the compressor with combined power generated by the gas turbine 3 and supplemental mechanical power generated by the electric motor/generator 23. When the mechanical power generated by the gas turbine 3 is null or the gas turbine is turning off, the method provides the step of disconnecting the gas turbine from the compressor (so that the gas turbine and the compressor are not torsionally coupled and no mechanical power is transferred), the step of operating the electric motor/generator 23 in a motor mode, the step of converting electric power into mechanical power in the electric motor/generator, the step of transferring the mechanical power from the electric motor/generator 23 to the compressor, the step of driving the compressor with the mechanical power generated by the electric motor/generator.

According to what stated above, the invention provides also a system for storing pressure energy in a pipeline for gas, comprising: at least one compressor 21 arranged in the pipeline 18 and design to compress the gas in the pipeline 18, a gas turbine 3 configured and arranged for driving the at least one compressor 21, an electric motor/generator 23 electrically connected to an electric power grid G, a first load coupling connecting 17-19 the gas turbine 3 to the at least one compressor, a second load coupling 22, connecting the compressor 21 to the electric motor/generator 23, wherein the electric motor/generator is adapted to function as a generator for converting excess mechanical power from the gas turbine into electrical power and delivering the electrical power to the electric power grid, and as a motor for supplementing driving power to the at least one compressor. Accordingly, the system comprises a disconnecting device to reversibly disconnect the compressor 21 from the gas turbine 3, so that the at least one compressor can be driven only by the motor. The system provide a phase of disconnection of the compressor from the gas turbine, and a subsequent phase of compression of gas in the pipeline 18 by operating the compressor 21 only by means of the electric motor 23. The gas is compressed to a pressure value in the pipeline above the service value of the gas in the pipeline.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

What is claimed is:

1. A drive system for driving a load, the drive system comprising:
    a gas turbine configured and arranged for driving the load, wherein the gas turbine comprises a gas generator compressor provided with movable inlet guide vanes and configured to receive air, the movable inlet guide vanes controlled to modify an air inlet flow rate of the air depending on operating conditions of the gas turbine and the load;
    an electric motor/generator electrically connected to an electric power grid;
    a first load coupling connecting the gas turbine to the load; and
    a second load coupling connecting the load to the electric motor/generator, wherein the electric motor/generator is adapted to function as a generator for converting excess mechanical power from the gas turbine into electrical power and delivering the electrical power to the electric power grid, and as a motor for supplementing driving power to the load,
    and wherein the drive system comprises a disconnecting device to reversibly disconnect the load from the gas turbine, so that the load can be driven only by the motor/generator.

2. The drive system of claim 1, wherein disconnection or connection made by the disconnecting device is operated manually by an operator or automatically by a motorization.

3. The drive system of claim 1, wherein the disconnecting device comprises a clutch between the load and the gas turbine.

4. The drive system of claim 1, wherein the disconnecting device comprises a removable coupling or a hydraulic torque converter.

5. The drive system of claim 1, wherein the second load coupling is arranged opposite to the first load coupling with respect to the load, such that the load is arranged between the gas turbine and the electric motor/generator.

6. The drive system of claim 1, wherein the load comprises at least one compressor.

7. The drive system of claim 6, further comprising a direct coupling provided between the at least one compressor and the electric motor/generator; wherein the at least one compressor and the electric motor/generator have a common shaft.

8. The drive system of claim 6, further comprising a coupling comprising a clutch provided between the at least one compressor and the electric motor/generator.

9. The drive system of claim 1, wherein the gas turbine comprises:
    a gas generator comprising a gas generator rotor; and
    a power turbine including a power turbine rotor,
    wherein the power turbine rotor being mechanically separated from, or not torsionally coupled to, the gas generator rotor.

10. The drive system of claim 9, wherein the gas generator comprises the gas generator compressor, a combustion chamber, and a high-pressure turbine; wherein the gas generator rotor comprises a first rotor of the gas generator compressor and a second rotor of the high-pressure turbine, and wherein the first rotor of the gas generator compressor and the second rotor of the high-pressure turbine being mounted on a common shaft.

11. The drive system of claim 9, wherein the power turbine comprises movable nozzle guide vanes that can be used to modify flow conditions of combustion gas entering the power turbine from the gas generator.

12. The drive system of claim 1, further comprising a frequency converter connected between the electric motor/generator and the electric power grid, wherein the frequency converter is configured and controlled for conditioning electric frequency from the electric power grid to the electric motor/generator and from the electric motor/generator to the electric power grid.

13. The drive system of claim 1, wherein the electric motor/generator comprises a variable-frequency drive electric motor/generator.

14. A method of operating a gas turbine system comprising a gas turbine and a load driven by the gas turbine, the method comprising:
    mechanically coupling a load to the gas turbine, wherein the gas turbine comprises a gas generator compressor provided with movable inlet guide vanes and configured to receive air;
    controlling the movable inlet guide vanes to modify an air inlet flow rate of the air depending upon operating conditions of the gas turbine and the load;
    mechanically coupling an electric motor/generator to the load, wherein the electric motor/generator is arranged opposite to the gas turbine with respect to the load;
    generating mechanical power by the gas turbine;
    powering the load with the mechanical power generated by the gas turbine;
    when the mechanical power generated by the gas turbine exceeds mechanical power required to drive the load:
        operating the electric motor/generator in a generator mode;
        transferring excess mechanical power from the gas turbine to the electric motor/generator;
        converting the excess mechanical power into electric power in the electric motor/generator;
    when the mechanical power generated by the gas turbine is not null and less than the mechanical power required to drive the load:
        operating the electric motor/generator in a motor mode;
        electrically powering the electric motor/generator;
        converting the electric power into supplemental mechanical power in the electric motor/generator;
        transferring the supplemental mechanical power from the electric motor/generator to the load;
        driving the load with the mechanical power generated by the gas turbine and the supplemental mechanical power generated by the electric motor/generator;
    when the mechanical power generated by the gas turbine is null or the gas turbine is turning off:
        disconnecting the gas turbine from the load;
        operating the electric motor/generator in a motor mode;
        converting the electric power into mechanical power in the electric motor/generator;
        transferring the mechanical power from the electric motor/generator to the load; and
        driving the load with the mechanical power generated by the electric motor/generator.

15. The method of claim 14, wherein the load comprises at least one compressor.

16. The method of claim 15, wherein the at least one compressor compresses a gas in a pipeline.

17. A system for storing pressure energy in a pipeline for gas, the system comprising:

at least one compressor arranged in the pipeline and configured to compress a gas in the pipeline;

a gas turbine configured and arranged for driving the at least one compressor, wherein the gas turbine comprises a gas generator compressor provided with movable inlet guide vanes and configured to receive air, and wherein the movable inlet guide vanes are controlled to modify an air inlet flow rate of the air depending upon operating conditions of the gas turbine and the load;

an electric motor/generator electrically connected to an electric power grid;

a first load coupling connecting the gas turbine to the at least one compressor;

a second load coupling, connecting the at least one compressor to the electric motor/generator, wherein the electric motor/generator is configured to function as a generator for converting excess mechanical power from the gas turbine into electrical power and delivering the electrical power to the electric power grid, and as a motor for supplementing driving power to the at least one compressor; and a disconnecting device to reversibly disconnect the at least one compressor from the gas turbine, so that the at least one compressor can be driven only by the motor/generator, wherein the system provides a phase of disconnection of the at least one compressor from the gas turbine, and a subsequent phase of compression of the gas in the pipeline by operating the at least one compressor only by the electric motor.

18. The system of claim 17, wherein the disconnecting device comprises a self-synchronizing clutch.

19. The drive system of claim 3, wherein the clutch between the load and the gas turbine comprises a self-synchronizing clutch.

* * * * *